(No Model.)
D. P. DRISCOLL.
COUPLING DEVICE.
No. 296,394.   Patented Apr. 8, 1884.
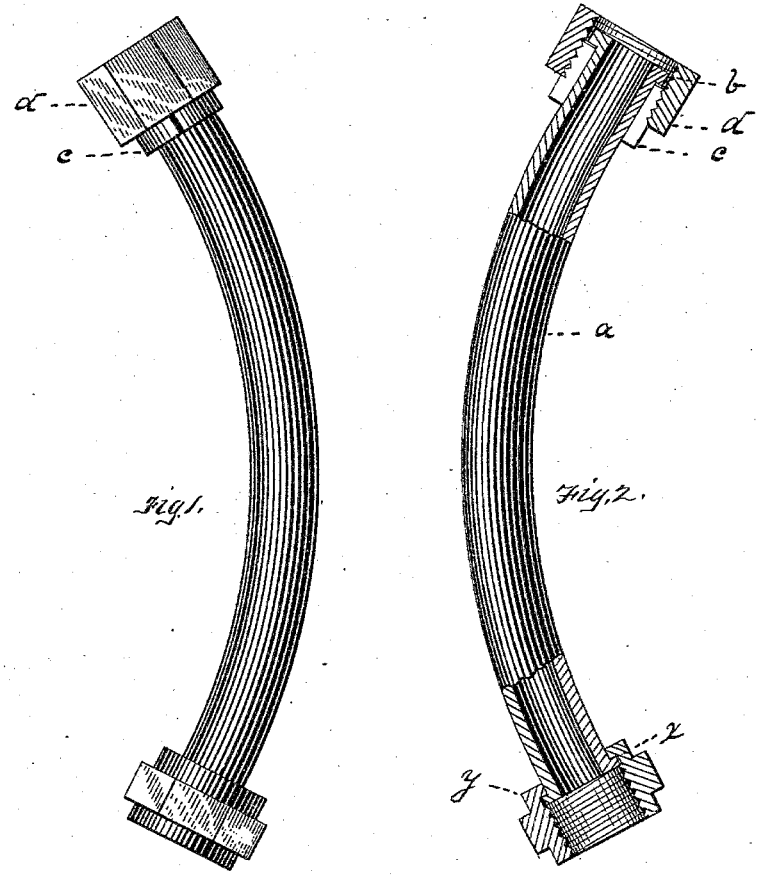
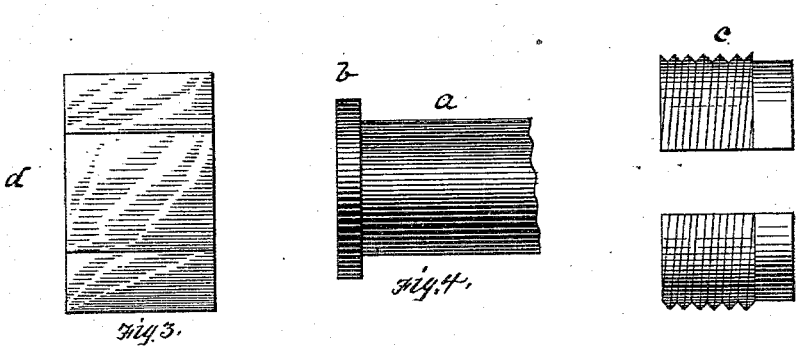
Witnesses
J. K. Smith
L. C. Fitler
Inventor
Daniel P. Driscoll
by his attys
Bakewell & Kerr

UNITED STATES PATENT OFFICE.

DANIEL P. DRISCOLL, OF PITTSBURG, PENNSYLVANIA.

COUPLING DEVICE.

SPECIFICATION forming part of Letters Patent No. 296,394, dated April 8, 1884.

Application filed October 17, 1881. (No model.)

*To all whom it may concern:*

Be it known that I, DANIEL P. DRISCOLL, of Pittsburg, in the county of Allegheny and State of Pennsylvania, have invented a new and useful Improvement in Coupling Devices; and I do hereby declare the following to be a full, clear, and exact description thereof, reference being had to the accompanying drawings, forming a part of this specification, in which—

Figure 1 is a plan view of my improved coupling as attached to a pipe, the old form of coupling being also shown. Fig. 2 is a plan view, partly in section, showing my improved coupling attached to a pipe. Fig. 3 is a view showing the collar detached. Fig. 4 is a view of a portion of the pipe. Fig. 5 is a view showing the male screw-collar detached.

Like letters of reference indicate like parts in each.

My invention relates to an improvement in screw-couplings; and it consists in the use of a split or divided screw-collar, which fits around the pipe behind a collar formed on the end of the pipe, and a larger screw-collar, which passes over the collar on the end of the pipe and screws onto the split or divided collar, thereby affording a coupling which can be easily removed from the pipe.

Heretofore the couplings commonly used on many pipes, especially on steam-engines and locomotives, have been objectionable, because they could not be removed from the pipe without destroying or removing the collar $x$, formed on the end of the pipe, which collar, with the shoulder $y$, kept the coupling from falling off the pipe. This collar $x$ is brazed to the pipe, and in order to remove the coupling for repair it was necessary to knock off the collar and afterward braze it on again when the coupling has been replaced. My improved coupling is free from this objection, and it can be removed from the pipe without injury to the collar on the pipe.

I will now describe my invention, so that others skilled in the art may manufacture the same.

In the drawings, $a$ represents the pipe, and $b$ the collar brazed on the end of the pipe. Behind the collar $b$, around the pipe $a$, there is placed a male screw-collar, $c$, which is divided in sections, as shown in Fig. 5. This collar $c$ is thicker than the collar $b$, so that the threaded surface shall project beyond the surface of the collar $b$. Passing over the collar $b$ and screwing onto the collar $c$ is a larger collar or nut, $d$, provided with a female screw-thread. These several parts form my coupling complete. The collar $c$, held by the nut $d$, forms a stop or shoulder on the inside of the nut, which presses against the collar $b$ and forms a tight joint. In case the nut should be injured, as it often is, it may be removed from the pipe without injury to the collar $b$. The end of the other pipe or connection which it is designed to couple to the pipe $a$ screws into the open end of the nut $d$.

The advantages of my invention are the simple and rapid manner in which the coupling can be removed from the pipe without causing the waste of time, labor, and expense incident to the former couplings.

The collar $c$ may be formed in two or more pieces, as is desired, these pieces being separate from each other or hinged together; or the collar may be split, so as to enable it to be opened and passed around the pipe.

I am aware that a coupling-collar having a smooth shouldered opening at one end, said opening of slightly greater diameter than the collar on the pipe, has been used in conjunction with a plain sectional reducing-ring, and do not herein claim such construction, first, because the coupling, when not in use, is insecure and liable to be lost; secondly, because the parts require special constructions, which adds materially to the cost of manufacture, whereas my collar and reducing-ring are readily threaded by means in common use and at little cost, and the parts remain united when not in use.

Having thus described my invention, what I claim, and desire to secure by Letters Patent, is—

1. A coupling consisting of an internally-threaded coupling-collar, in combination with an externally-threaded separable reducing-ring adapted to form a shoulder within the coupling-collar, substantially as and for the purpose specified.

2. In a screw-coupling, the combination, with a pipe having a collar thereon, of an internally-threaded coupling-collar and an externally-threaded reducing-ring adapted to form a shoulder within the coupling-collar, substantially as and for the purpose specified.

In testimony whereof I have hereunto set my hand.

DANIEL P. DRISCOLL.

Witnesses:
L. C. FITLER,
J. K. SMITH.